(12) United States Patent
Nayak et al.

(10) Patent No.: US 7,502,196 B2
(45) Date of Patent: *Mar. 10, 2009

(54) HEAD ACTUATOR DESIGN FOR A LOW PROFILE TAPE DRIVE

(75) Inventors: Ashok B. Nayak, Glendora, CA (US); James M. Decot, Fountain Valley, CA (US)

(73) Assignee: Certance LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,620

(22) Filed: Apr. 28, 2008

(65) Prior Publication Data

US 2008/0198495 A1 Aug. 21, 2008

Related U.S. Application Data

(63) Continuation of application No. 11/224,882, filed on Sep. 12, 2005, now Pat. No. 7,379,259.

(51) Int. Cl.
*G11B 21/02* (2006.01)
*G11B 5/55* (2006.01)
(52) U.S. Cl. .................. 360/75; 360/78.02; 360/261.1; 360/291
(58) Field of Classification Search ........................ None
See application file for complete search history.

(56) References Cited

U.S. PATENT DOCUMENTS

| 5,566,378 | A | 10/1996 | Nagasawa et al. |
|---|---|---|---|
| 5,739,984 | A | 4/1998 | Eckberg |
| 6,151,188 | A | 11/2000 | Takano et al. |
| 6,225,799 | B1 | 5/2001 | Gergel et al. |
| 6,333,838 | B1 | 12/2001 | Anderson |
| 6,594,118 | B1 | 7/2003 | Nayak et al. |
| 7,379,259 | B2 * | 5/2008 | Nayak et al. ............... 360/75 |
| 2002/0063989 | A1 | 5/2002 | White et al. |

* cited by examiner

*Primary Examiner*—Andrew L Sniezek
(74) *Attorney, Agent, or Firm*—Baker Botts L.L.P.

(57) ABSTRACT

A head actuator design for a low profile tape drive is configured with a damping system for a head suspension system having flexure springs to accommodate a half-high form factor. The damping system employs hall sensors, for example, mounted on the head carriage that moves with the head carriage to provide position signals that are differentiated to form velocity signals used by a servo loop control system to dampen suspension system resonance. A flexible circuit routing is provided that is manageable for half-high form factors by combining the fine positioner loop and course positioner loop into a single loop, and preventing the head flexible printed circuit from contacting a top cover in the routing to a printed circuit board near the top cover.

11 Claims, 8 Drawing Sheets

HEAD ACTUATOR DESIGN FOR A LOW PROFILE TAPE DRIVE

CROSS REFERENCE TO RELATED APPLICATION

The present application is a continuation of U.S. patent application Ser. No. 11/224,882 filed Sep. 12, 2005 now U.S. Pat. No. 7,379,259, which is incorporated herein for all purposes.

FIELD OF THE INVENTION

The present invention relates to the field of storage technology, and in particular, to tape drives having low profiles.

BACKGROUND OF THE INVENTION

Tape drives have been widely employed in industry for over thirty years due to their ability to store large amounts of data on a relatively small, inexpensive removable format. The data is stored on tape drives utilizing a variety of designs, but in all cases, magnetic tape media is wound between a pair of tape reels as data is transferred to or from the tape media. The standard tape media employed in many applications is a one half-inch wide tape media housed in a tape cartridge measuring at or near 1 inch in height. The most common form factor for tape drives measures 8 inch.times.5.75 inch.times.3.25 inch in width, length and height respectively. Therefore, typical half-inch tape drives occupy two drive bays when installed in a conventional computer housing.

In the art of data storage, the physical space required to store data is an important concern. Thus, it is desirable to have a half-inch tape drive that is constructed with a half-height form factor that can be installed in a single drive bay in a conventional computer housing. The form factor of the half-high tape drive measures the same as the full high form factor in width and length. However, the height is ½ of the full high size, namely 1.625 inch. Due to this height limitation, the majority of the sub-assemblies must be changed from their full high version to accommodate the substantial height reduction.

For example, the conventional head flexible printed circuit routing is unmanageable in a half-high form factor configuration, due to the space limitations. Two separate loops are conventionally provided, one for the coarse actuator and one for the fine actuator, making up the head actuator. Because of the space limitations, it is difficult to provide two separate loops. In addition, the head flexible printed circuits are routed to a printed circuit board that is located at the bottom side of the tape drive.

Prior systems which describe damping use relatively large devices, such as bulky linear tachometers. Half-high drives do not have the space available for such large devices. Furthermore, in addition to the increase in mass and height, the linear tachometer devices described in the prior art use additional wiring to connect to a printed circuit board.

SUMMARY OF THE INVENTION

There is a need for a half-high tape drive and head actuator for such a drive that will have all the features required to perform reading and writing on a 12.7 mm (½ inch) wide tape of a tape cartridge, such as an LTO (Linear Tape Open) cartridge and be able to be packaged into a half-high tape drive.

This and other needs are met by embodiments of the present invention which provide a tape drive comprising a head actuator for a read/write head, a suspension system on which the head actuator is mounted, and a damping system coupled to the head actuator to dampen suspension system resonance. The damping system includes position sensors mounted on the head actuator.

By providing a suspension system for the head actuator, and a damping system in which the position sensors are mounted on the head actuator, the invention provides a compact arrangement suitable for use in a half-drive with the required space limitations. In certain embodiments of the invention, the position sensors include linear hall sensors that provide position signals proportional to motion of the read/write head. By differentiating the position signals, read/write head velocity information may be derived and used to create servo control signals to damp suspension system resonance.

Compactness is enhanced, in certain embodiments, by providing flexible printed circuits that are routed to a printed circuit board at the top cover of the tape drive. The flexible printed circuits, in certain embodiments, have both the fine and coarse positioner loops that are combined into a single loop. Further, the linear hall sensors are connected, in certain embodiments, to the printed circuit board by the flexible printed circuit, thereby avoiding additional wiring. Contact of the flexible printed circuits against the top cover during movement of the head is prevented, in certain embodiments, by a bracket mounted near the top cover.

The earlier stated needs are also met by other aspects of the present invention which provide a tape drive comprising a tape housing with a top cover, a head actuator with a head carriage for a read/write head, a printed circuit board of the top cover, and a flexible printed circuit extending between the head carriage and the printed circuit board. The flexible printed circuit is routed such that it remains out of contact with the top cover in all positions of the head carriage.

The earlier stated needs are met by still other aspects of the present invention which provide a half-high form factor tape drive comprising a head actuator coupled to a spring suspension system and means for damping resonance of the spring suspension system. In certain embodiments, the tape drive further comprises means for electrically connecting the head actuator to a printed circuit board flexibly without contacting a top cover of the tape drive in any position of the head actuator.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to providing a head actuator assembly in a half-high size tape drive system. In particular, the present invention achieves this, at least in part, by providing a flexible printed circuit routing design that combines the fine and coarse positioner loops of a tape drive into one loop. In addition, the flexible printed circuit routing is designed to work well in have half-high drives where the printed circuit board is located on the top side of the drive. The resulting reduced length of the flexible printed circuit is advantageous. Further, in the half-high form factor, the suspension system resonance problem is overcome by damping after detecting the motion of the head carriage assembly. The motion detection is achieved by using sensors, such as linear hall sensor technology. In certain embodiments, the linear hall sensor is located on the head carriage and as the carriage translates, the linear hall sensor generates a signal that is proportional to the head motion. Differentiating this signal allows derivation of the velocity information which is used in a servo loop to derive the necessary damping. By providing the wiring for the hall sensors, as in certain embodiments, via the head flexible circuits, the need for additional wiring and routing requirements for the terminals of the hall sensors is eliminated, thereby allowing the system to be used in a half-high form factor tape drive.

Figure 1:
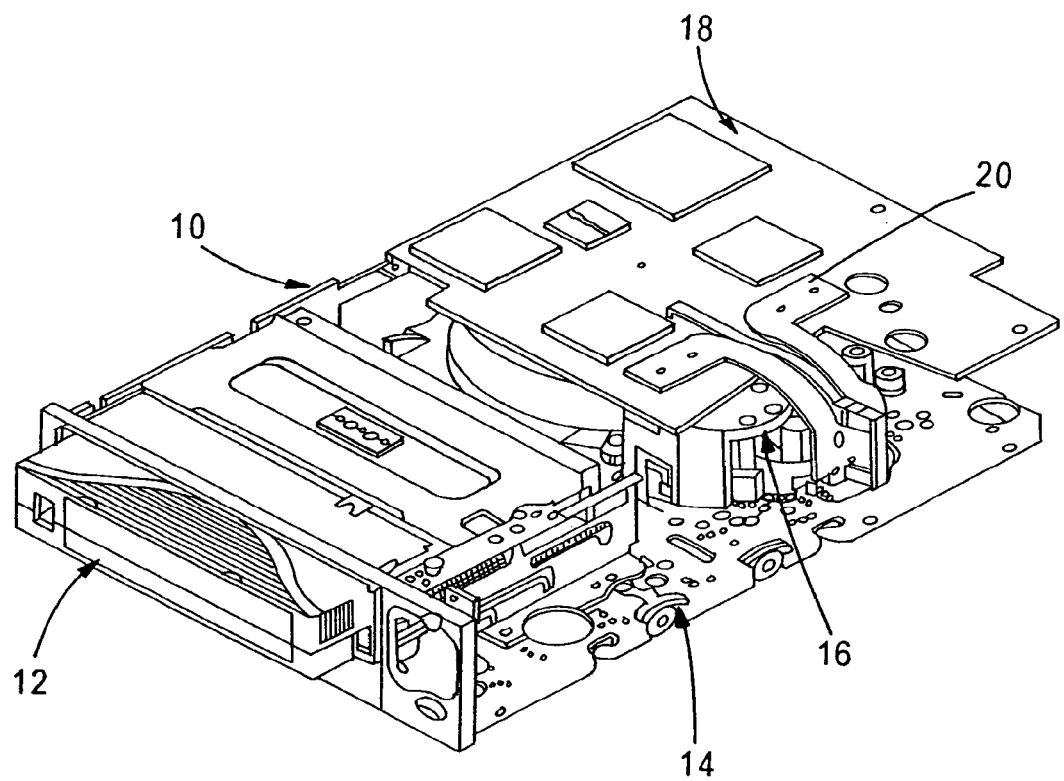
FIG. 1 depicts a perspective view of a tape drive of a half-high form factor with the housing removed for illustration purposes, in accordance with embodiments of the present invention.

FIG. 1 depicts a perspective view of a half-high drive assembly 10 of a tape drive constructed in accordance with embodiments of the present invention. The housing for the tape drive, such as the top cover, is not depicted in FIG. 1.

A tape cartridge 12, such as an LTO tape cartridge, with half-inch tape, is insertable at one end of the drive assembly 10. As shown, the front half of the drive 10 is occupied with the cartridge 12 and cartridge loading mechanisms provided on a drive base plate 14. Hence, the design is forced to create space for a printed circuit board 18 in the rear half of the drive 10, with only half the length of the drive 10. The head actuator assembly 16 must be designed in the remaining place and still maintain the majority of the design features of an actuator of a full-high tape drive.

Figure 2:
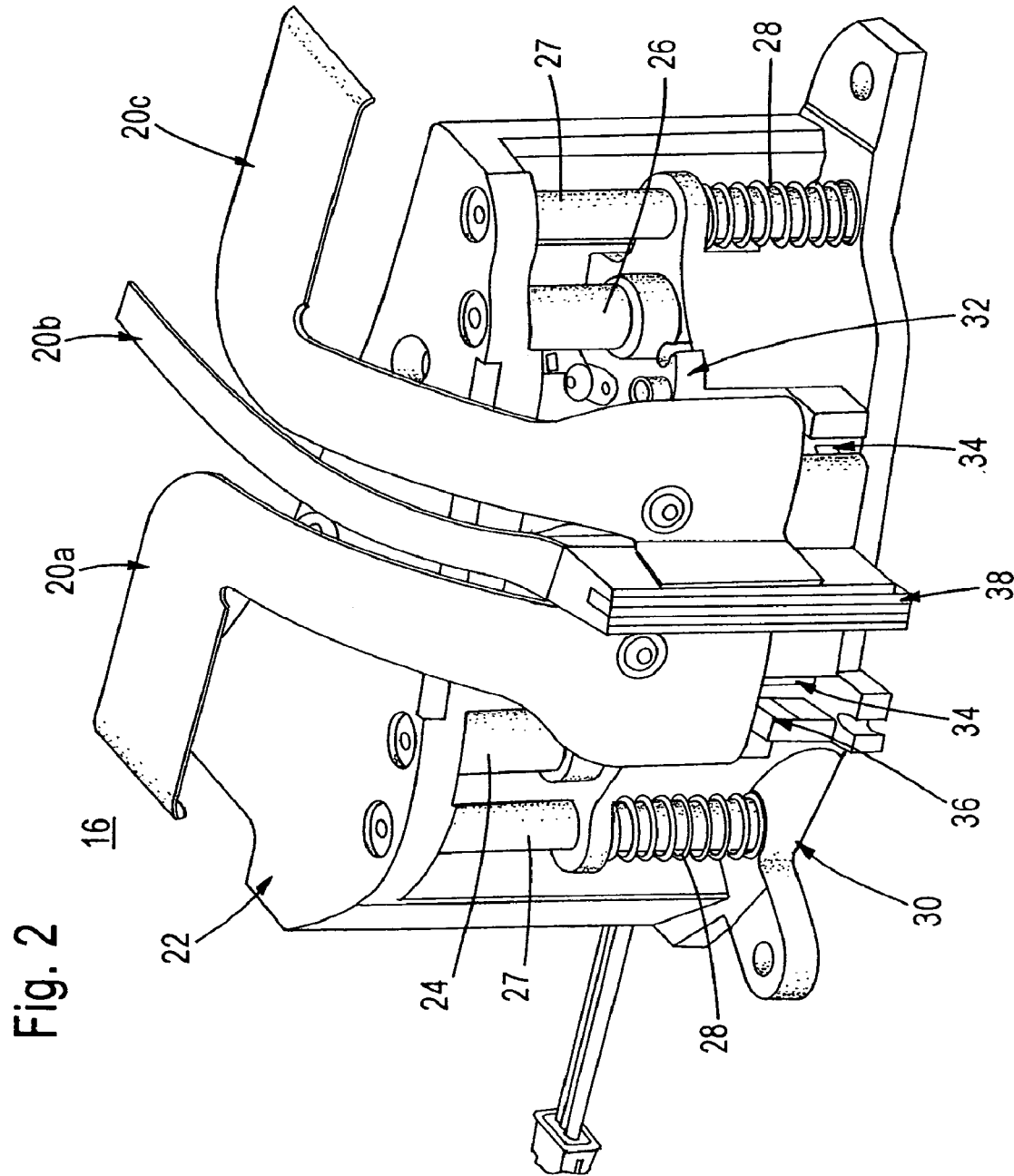
FIG. 2 is a perspective view of an actuator assembly constructed in accordance with embodiments of the present invention.
Figure 3:
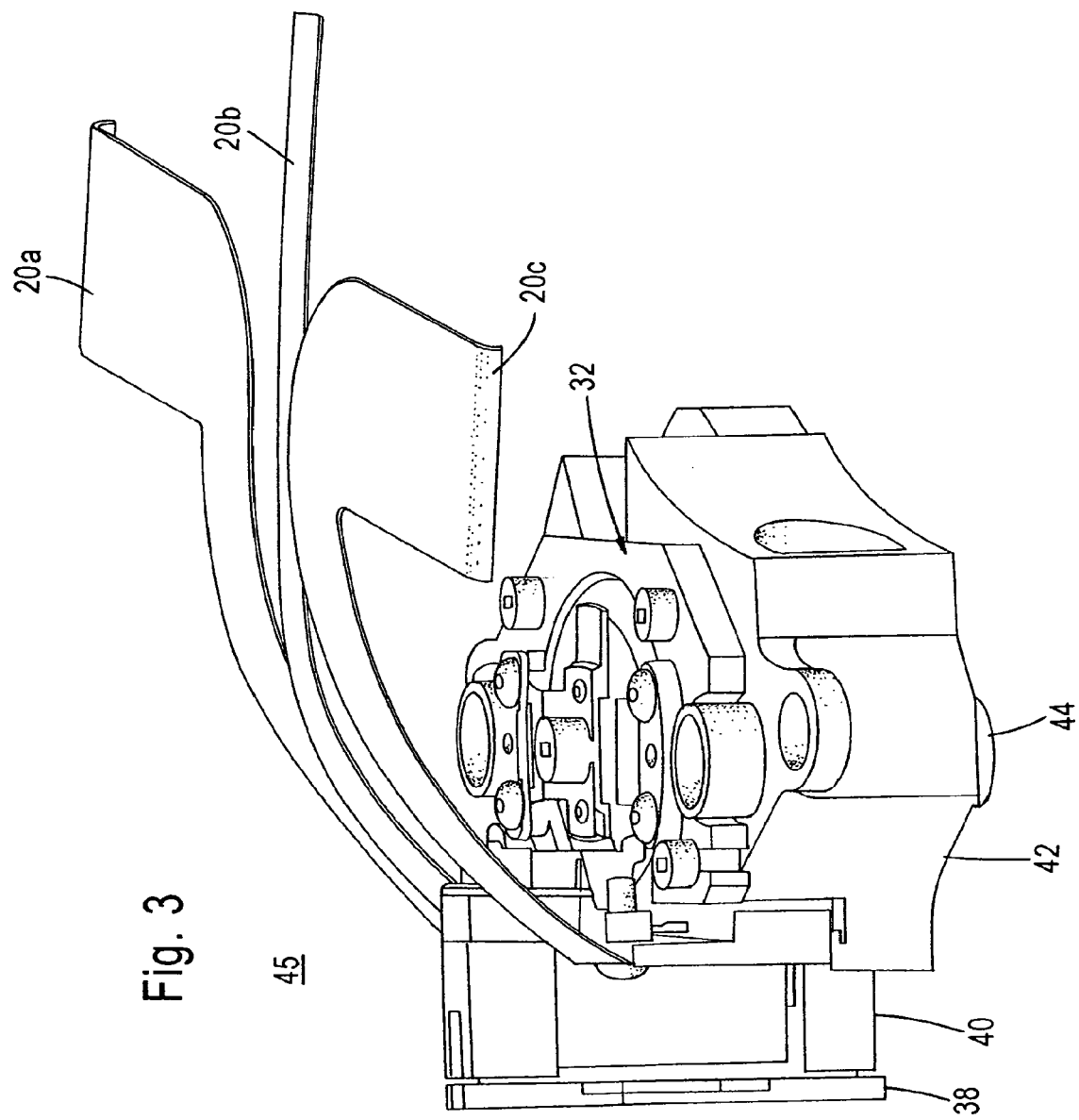
FIG. 3 is a perspective view of a coarse positioner base assembly constructed in accordance with embodiments of the present invention.

The head actuator assembly 16 includes a coarse positioner base assembly 45, best pictured in FIG. 3, on which many of the components of head actuator assembly 16 are mounted. Referring now to FIGS. 2 and 3, coarse positioner base 42 of the coarse positioner base assembly 45 is slideably mounted on first and second shafts 24, 26. The first shaft is a guide shaft 24, affixed to the coarse positioner base assembly 45, and the second shaft is an anti-rotation shaft 26, also affixed to the coarse positioner base assembly 45. This two shaft system prevents a low first mode of resonance, as normally occurs in a single shaft system having a cantilever beam with a low first mode of resonance. Because of the structural rigidity provided by the combination of the coarse positioner base 42, and guide shaft 24 and anti-rotation shaft 26, a required servo-bandwidth is achieved to meet the necessary accuracy requirements of high-capacity tape drives.

At the top, the guide shaft 24 is supported by a top cap 22 that is vertically mounted on the actuator base plate 30. The anti-rotation shaft 26 is also attached to the top cap 22.

In addition to the coarse positioner base assembly 45, the actuator assembly 16 also includes a fine positioner assembly or actuator 32. The actuator base plate 30, the top support cap 22 and the four shafts 24, 26, and 25, 27 form a structurally rigid frame. The high structural strength is necessary for bode-plot performance of the head actuator assembly 16.

The drive base plate 14 has a base plate assembly that houses a three-point attachment system (not shown). The actuator assembly 16 is connected to the drive base plate 14 at these three points. The three-point system is utilized to set the head 38 in proper orientation with respect to the tape (not shown) in azimuth and zenith directions.

The coarse positioner base assembly 45 is guided at the main guide shaft 24 and the anti-rotation shaft 26. The coarse positioner base assembly 45 is translated using a lead screw and nut system (not shown). The lead screw is driven by a stepper motor through a gear train (not shown). The springs 28, mounted on the shafts 25 and 27, provide a spring biasing force to the coarse positioner base assembly 45.

The coarse positioner base assembly 45 includes bushings 44 through which the guide shaft 24 and the anti-rotation shaft 26 extend. The bushings 44 provide four-point support for the coarse positioner base 42, resulting in increased structural rigidity in comparison to conventional designs.

The coarse positioner base assembly 45 carries a fine positioner assembly 32, as best seen in FIG. 3. Also shown in FIGS. 2 and 3 are flexible printed circuits 20a and 20b and 20c. Flexible printed circuits 20a and 20c are the left and right head flexible printed circuits, respectively. The center flexible printed circuit 20b is a voice coil flexible printed circuit.

As will be described in more detail later, the head carriage 40, which carries the head 38, also carries linear hall sensors 34 that interact with double pole magnets 36 that are stationarily mounted. Two hall sensors 34 are provided on opposites sides of the head carriage 40. Thus, a head carriage assembly 47 comprises the magnetic head 38, the head carriage 40, two flexible printed circuits 20a, 20b, and two hall sensors 34. The head carriage assembly 47 is in isolation depicted in two perspective views from opposite sides in FIGS. 4 and 5.

Figure 8:
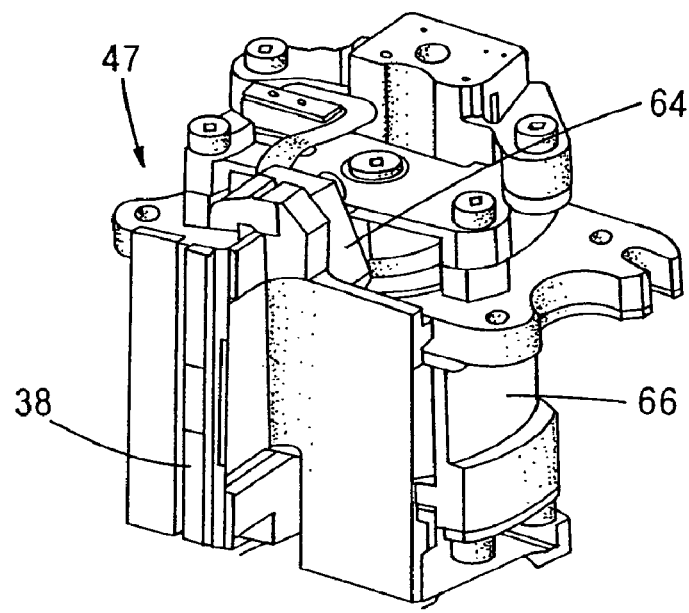
FIG. 8 is a front perspective view of a fine positioner assembly constructed in accordance with embodiments of the present invention.
Figure 9:
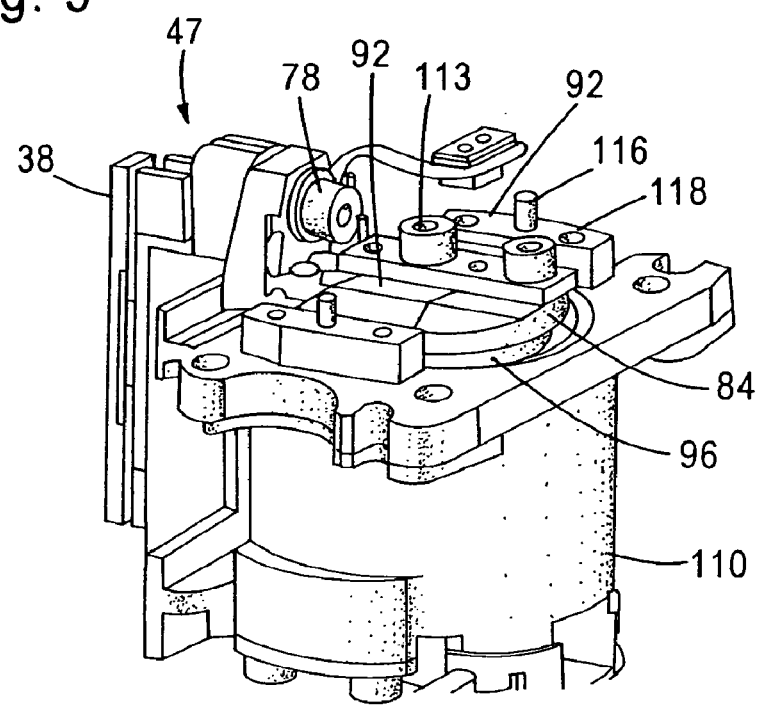
FIG. 9 is a back perspective view of the fine positioner assembly constructed in accordance with embodiments of the present invention.
Figure 10:
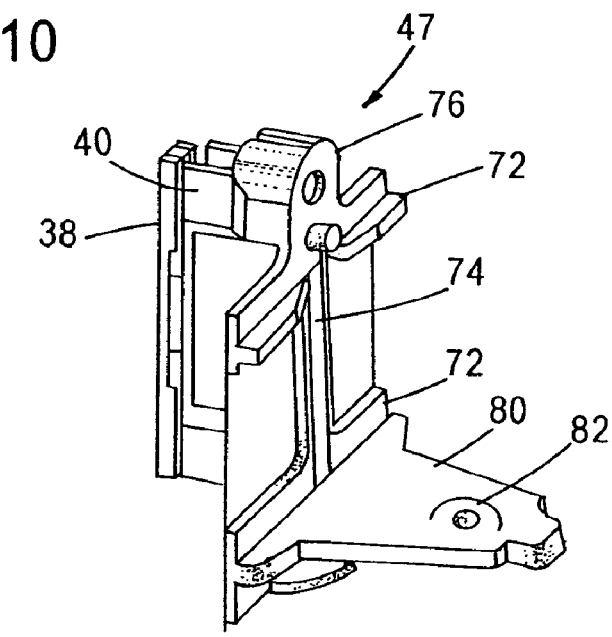
FIG. 10 is a back perspective view of a head carriage assembly in isolation constructed in accordance with embodiments of the present invention.

An exemplary embodiment of a fine positioner assembly 32 is depicted in isolation in FIG. 8. The fine positioner assembly 32 is coupled to the head carriage assembly 47, which carries the head 40. The fine positioner assembly 32 also includes a voice coil holder assembly 64 and a voice coil motor holder assembly 66. The fine positioner assembly 32 is carried by the coarse positioner base assembly 45 (FIG. 3) that provides the coarse positioning of magnetic head 38. The exemplary embodiment of the fine positioner assembly 32 of the present invention employs a linear voice coil motor and flexures to provide for fine positioning of the head 38. As seen in FIG. 10, the head carriage assembly 47 may include a read/write head holder 40 supported by horizontal support elements 72 that are connected together by a vertical support bar 74. A screw hole 76 receives a fastening screw 78 that connects the voice coil holder assembly 64 to the head carriage assembly 47 at a top portion thereof. A horizontal support member 80 extends from the lower horizontal support element 72. The horizontal support member 80 includes a screw hole 82 through which the voice coil holder assembly 64 is secured by another fastener (not shown).

Figure 11:
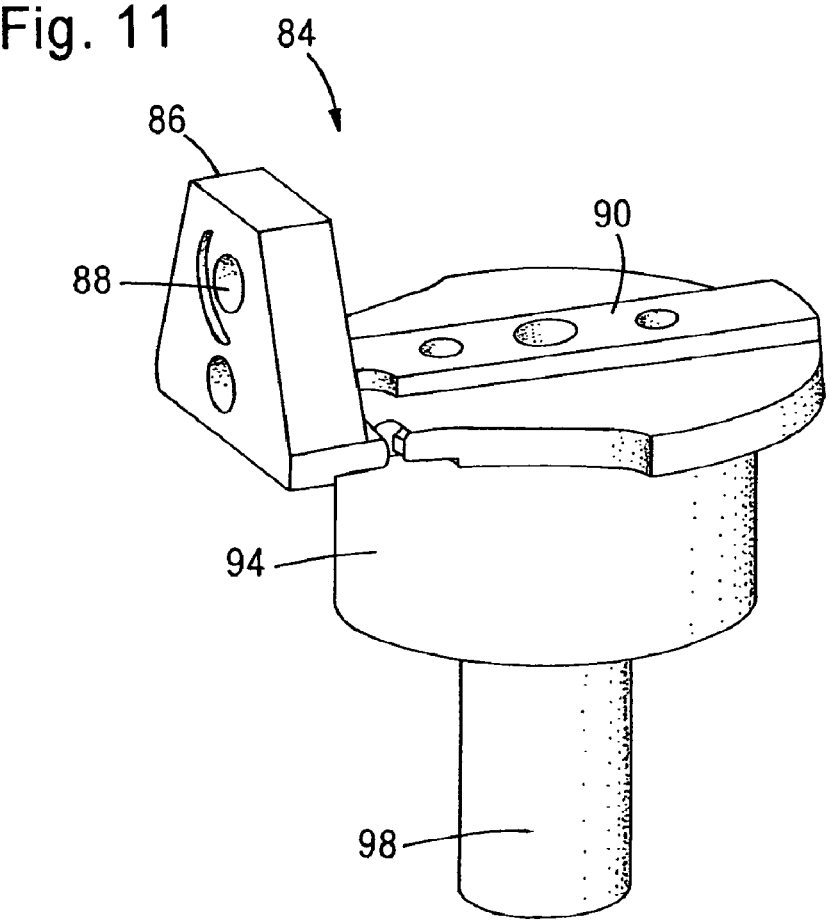
FIG. 11 is a voice coil holder constructed in accordance with embodiments of the present invention depicted in isolation.
Figure 12:
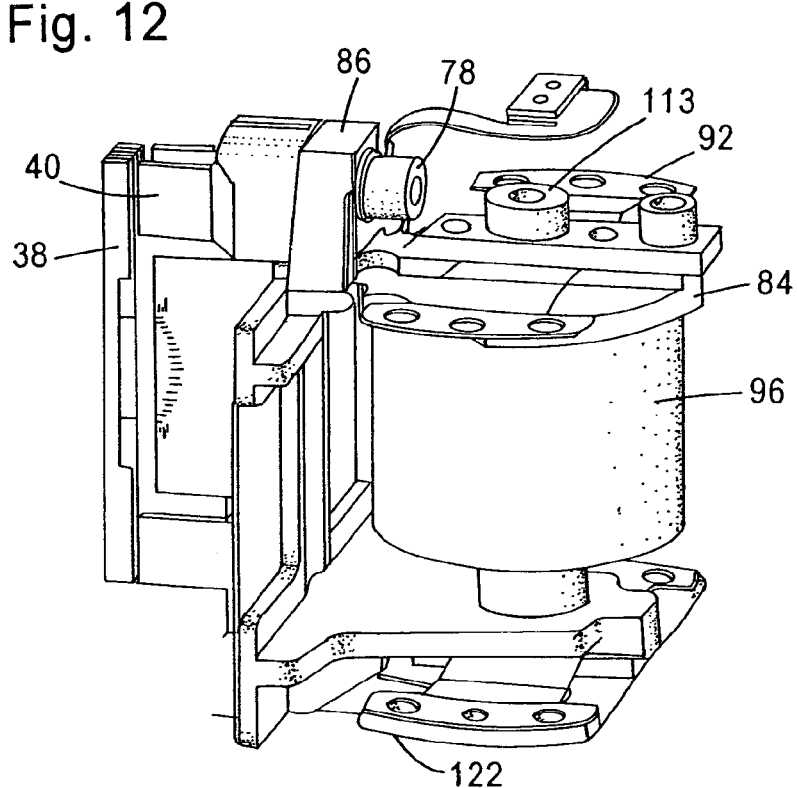
FIG. 12 depicts the head carriage assembly and voice coil and voice coil holder in an assembled state in accordance with embodiments of the present invention.

The voice coil holder assembly 64 includes a voice coil holder 84 (seen in isolation in FIG. 11) and a voice coil 96 (seen in FIG. 12). A voice coil holder 84 may be made of a stiffer material, such as aluminum, to provide structural rigidity that is many times stronger than a plastic material that may be employed in the head carriage assembly 47.

Adverting to FIG. 8, the voice coil holder 84 includes an attachment section 86 with a hole 88 to attach the voice coil holder 84 to head carriage assembly 47 at the threaded hole 76. The voice coil holder 84 includes a top flexure mounting surface 90 to which a top flexure 92 (see FIG. 12) is attached.

A voice coil mounting cylinder 94 of the voice coil holder 84 fits within the voice coil motor, as will be described later. The voice coil 96 is mounted to the cylinder 94. A threaded hole 98 is provided at the bottom of the voice coil holder 84 and provides a means for attaching the voice coil holder 84 to the head carriage assembly 47 at the horizontal support member 80 through the screw hole 82 (see FIG. 10). Note that the flexible printed circuits are not depicted in FIGS. 8-12, for illustrative purposes.

Figure 13:
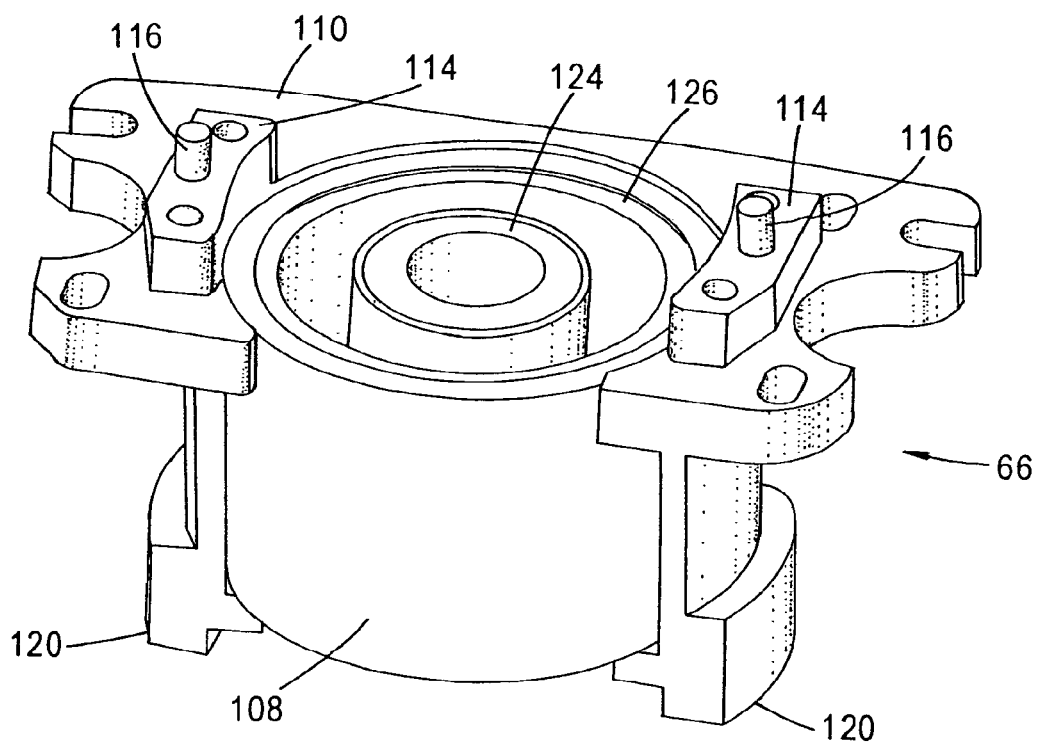
FIG. 13 is a top perspective view of a voice coil motor and voice coil motor holder constructed in accordance with embodiments of the present invention.

FIG. 13 is a perspective view of the voice coil motor holder assembly 66 in isolation. The voice coil motor 108 is securely held within a voice coil motor holder 110 of the voice coil motor holder assembly 66. Referring to FIGS. 10-13, voice coil holder assembly 64 is assembled into the voice coil motor holder assembly 66 in order to place the voice coil 96 into the magnetic gap of the voice coil motor 108. Top flexure 92 is assembled first at its center portion using the screw 113 and then at its outer portion such that it is secure to the mounting surfaces 114 of the assembly 66. Head-carriage assembly 47 is assembled to the voice coil holder assembly 64, using the screw 78 such that the holes 88 and 76 are aligned. Bottom flexure 122 is assembled at its outer portions at the surfaces 120 of the assembly 66. The center portion of bottom flexure 122 and the support 82 of the head carriage assembly 47 are secured to the voice coil holder assembly 64, using a screw fastened into the threaded hole 98.

The voice coil motor holder 110 has a pair of top flexure mounting surfaces 114 on which the top flexure 92 is mounted. Locating posts 116 help to locate the top flexure 92 during assembly and fasteners 118 (see FIG. 9) secure the top flexure 92 to the top flexure mounting surfaces 114. Bottom flexure mounting surfaces 120 provide a surface for mounting the bottom flexure 122 (see FIG. 12) by fasteners that are not shown.

The voice coil motor 108 may have a substantially cylindrical design but include a tapered center pole 124. The tapering of the center pole 124 of the voice coil motor 108 provides room for the voice coil mounting cylinder 94 to easily fit between the center pole 124 and magnet 126 of the motor 108.

The spring flexures 92 and 122 are part of the spring suspension system of the present invention. The damping of the suspension system resonance is achieved by detecting the motion of the head carriage assembly 47. In the present invention, this is achieved using linear hall sensor technology.

Figure 4:
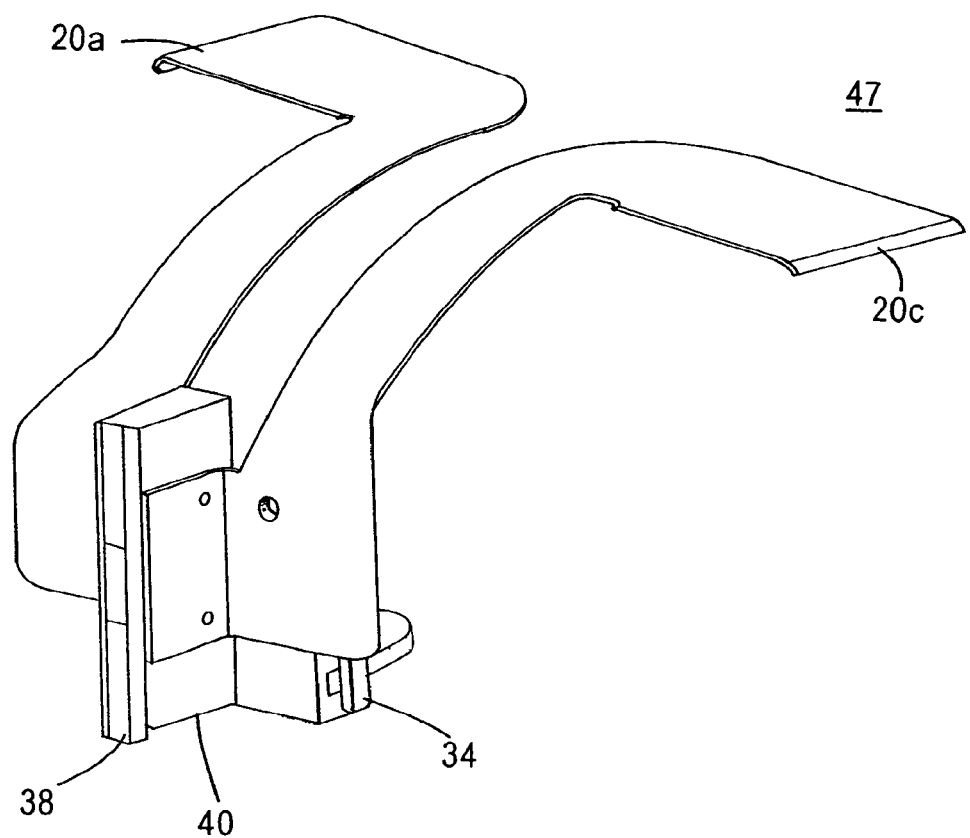
FIG. 4 is a perspective view from one side of the head, head carriage and sensor assembly in accordance with embodiments of the present invention.
Figure 5:
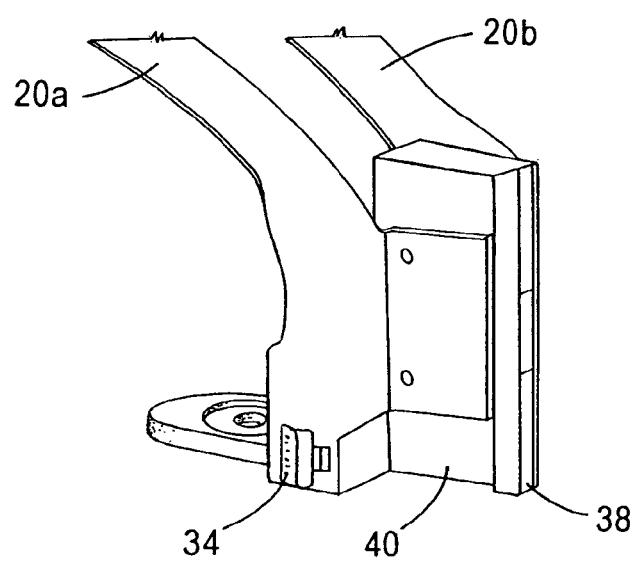
FIG. 5 depicts the head, head carriage and sensor from the other side.

Referring to FIGS. 2, 4 and 5, the linear hall sensor 34, located on the head carriage 47, interfaces with the double pole magnets 36 that are stationarily positioned. When head carriage assembly 47 translates, the linear hall sensor 34 generates a signal that is proportional to the motion of the head 38 in a transverse direction. These position signals are provided to the servo system on the main printed circuit board 18 (FIG. 1). The signals are carried by the flexible printed circuits 20a, 20c, so that additional routing and wiring devoted to the signals do not need to be provided.

The interaction between the linear hall sensor and dual pole magnet generates voltages which are linearly proportional to the head motion and may be considered position signals. The voltage signals are differentiated by a velocity determination module (not shown) in the servo system to differentiate the signals and derive read/write head velocity information from the differentiated position signals. The servo system also includes a servo control signal module (not shown) that generates servo control signals to damp the suspension system resonance based on the derived read/write head velocity information. The servo is a closed loop servo, for example. As can be recognized, the use of linear hall sensors in this damping mechanism does not require any additional height, so that it is particularly advantageous for half-high form factor drive design, such as in embodiments the present invention.

The moving mass consists of the magnetic head, the head-carriage, voice-coil and voice coil holder, the hall sensors, the flexure clamps and the screws. The stiffness of the spring flexures and the total moving mass forms a spring-mass system, which has a low frequency first mode resonance.

Additionally, the coarse positioner base assembly 45 requires a parking or reference position. When the tape drive 10 is booted up for the first time, the head 38 must always arrive at a known location. Once the magnetic head 38 is at this position, the control electronics on the printed circuit board 18 would move the head 38 to the required track. The second hall sensor 34 is located on the head flexible printed circuit 20b, on the opposite corner of the head 38. The interfacing magnet (not shown) is located on the drive base plate 14. The coarse positioner base assembly 45 moves to traverse the head 38 across the drive base plate 14. During the boot up of the tape drive 10, no matter where the head 38 is located in relation to the base plate 14, the coarse positioner is moved to find the reference location. This reference location is considered found when the reference hall sensor 34 receives the signal from the reference magnet. This design feature also does not require any additional height.

One of the concerns with the half-high form factor is to provide a routing that is manageable due to the space limitations required by such form factor. In embodiments of the present invention, as described earlier, the flexible printed circuits 20a, 20b and 20c are routed to the printed circuit board 18 at a top cover of the tape drive 10. Further, the fine and coarse positioner loops are combined into a single loop, carried by the flexible printed circuits 20a, 20c. The reduced length of the flexible printed circuits is an added advantage of the routing design.

Figure 6:
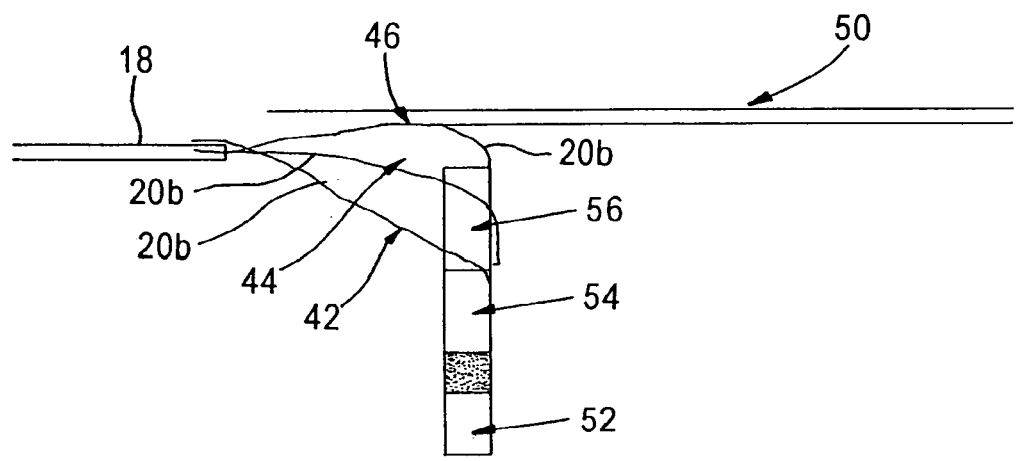
FIG. 6 shows a schematic, side view of a half-high form factor tape drive without a bracket to illustrate a potential concern during operation of the tape drive.

The head flexible printed circuit 20b moves up and down with the head 38 as it travels up or down. When the head 38 is moved to the upper half of the tape (not shown), the loop of the flexible printed circuit 20b close to the top cover 10, as shown in the schematic, cross-sectional depiction in FIG. 6, which illustrates a problem with the half-high form factor. A first, low head position 52 is depicted for head 38. A middle position 54 and a high position 56 are also depicted. The different respective positions of the flexible printed circuit 20b are respectively referenced by numerals 42, 44 and 46.

As the flexible printed circuit 20b contacts the top cover 50, the force required to move the flexible print circuit 20b against the top cover 50 is increased. This is at least partially due to the flexible printed circuit 20b increasing in stiffness when it contacts the top cover 50. The fine positioner assembly 32 may not be capable to deliver this force. In that case, the fine positioner assembly 32 will not function properly, so that the fine positioning of the head 38 will not be proper.

Figure 7:
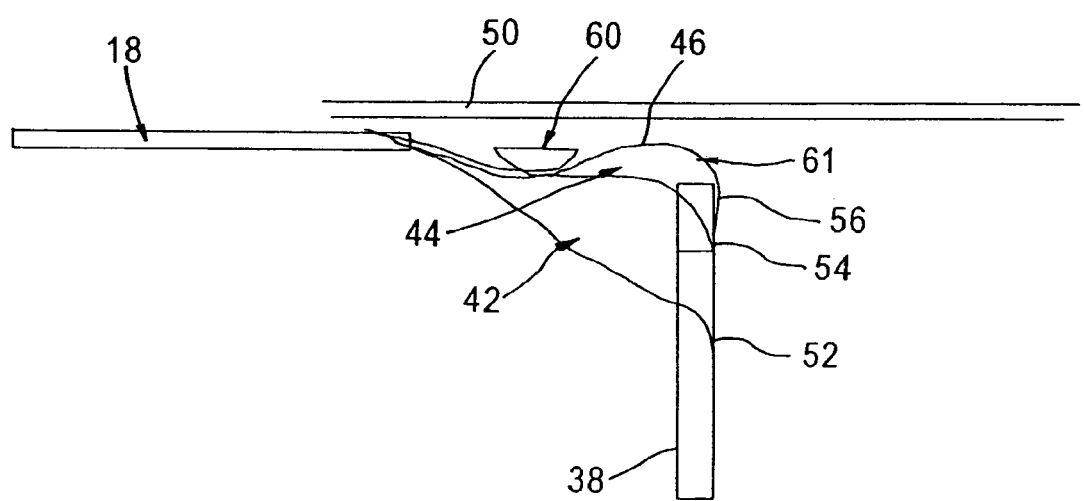
FIG. 7 depicts a similar arrangement as in FIG. 6, but with a bracket that alleviates the concern depicted in FIG. 6, in accordance with embodiments of the present invention.

To overcome this concern, a flexible printed circuit routing bracket 60 is provided at or near the top cover 50 of the tape drive. This is depicted in FIG. 7, in which an embodiment of the bracket 60 is depicted. However, it should be apparent that other configurations for the bracket 60 may be employed without departing from the present invention. The role of the bracket 60 is to prevent the loop of the flexible printed circuit 20b from approaching the top cover 50. The flexible printed circuit 20b comes into contact with the bottom of the bracket 60 as the head 38 moves from middle position 54 to the highest position 56. The bracket 60 is positioned such that while the flexible printed circuit 20b is in contact with it, some horizontal loop 61 still remains. Hence, the bracket 60 prevents contact of the flexible printed circuit 20b with the top cover 50, allowing the fine positioning of the head 38 to remain proper.

The embodiments of the invention find particularly utility in a half-high form factor, but are not limited to such tape drives. Although the present invention has been described and illustrated in detail, it is to be clearly understood that the same is by way of illustration and example only and is not to be taken by way of limitation, the scope of the present invention being limited only by the terms of the appended claims.

What is claimed is:

1. A tape drive, comprising:
a head actuator for a read/write head;
a suspension system on which the head actuator is mounted; and
a damping system coupled to the head actuator to dampen suspension system resonance, the damping system including one or more position sensors mounted on the head actuator;
flexible printed circuits coupled to the read/write head, wherein the damping system includes a servo system responsive to signals from the one or more position sensors to control movement of the head actuator, and wherein the one or more position sensors are coupled to the servo system via the flexible printed circuits;
a printed circuit board, wherein the head actuator has a fine positioner and a coarse positioner, and further comprising fine and coarse positioner loops coupled between the fine positioner and the coarse positioner respectively and the printed circuit board, the fine and coarse positioner loops being combined into a single loop carried by the flexible printed circuit wherein the single loop comprises adjacent portions of flexible printed circuits, attached to opposite sides of the read/write head, simultaneously moving when the read/write head is being moved by the fine or coarse positioner;
wherein the one or more position sensors are configured to generate a position signal proportional to motion of the read/write head in a transverse direction;
wherein the servo system has a velocity determination module that differentiates the signals generated by the one or more position sensors and derives read/write head velocity information from the differentiated position signals;
wherein the servo system has a servo control signal module that generates servo control signals to dampen suspension resonance based on the read/write head velocity information.

2. The tape drive of claim 1, wherein the tape drive has a housing with a top cover, the printed circuit board being located at the top cover, the flexible printed circuits extending between a head carriage of the head actuator and the printed circuit board.

3. The tape drive of claim 2, further comprising a flexible printed circuit board routing bracket positioned at the top cover and between the head carriage and the printed circuit board, a top surface of the flexible printed circuit contacting a bottom portion of the bracket such that a loop remains in the flexible printed circuit at the highest position of the head carriage, the flexible printed circuit remaining out of contact with the top cover at the highest position of the head carriage.

4. The tape drive of claim 3, wherein the tape drive has a half-high form factor.

5. A tape drive, comprising:
a tape drive housing with a top cover;
a head actuator with a head covering for a read/write head;
a printed circuit board;
a flexible printed circuit extending between a head carriage of the head actuator and the printed circuit board; and
a flexible printed circuit routing bracket positioned at the top cover and between the head carriage and the printed circuit board, the flexible printed circuit routing bracket interacting with the flexible printed circuit during movement of the head carriage to prevent all contact of the flexible printed circuit with the top cover in all positions of the head carriage.

6. The tape drive of claim 5, wherein the head actuator includes a fine positioner and a coarse positioner, with a fine positioner loop and a coarse positioner loop, the fine positioner loop and the coarse positioner loop combined into a single loop on the flexible printed circuit.

7. The tape drive of claim 6, further comprising one or more position sensors mounted on the head actuator and moving with the head actuator, the one or more position sensors being coupled to the printed circuit board via the flexible printed circuit.

8. The tape drive of claim 7, wherein the one or more position sensors comprise linear hall sensors, and wherein the tape drive further comprises double pole magnets stationarily positioned in the tape drive to interact with the linear hall sensors, such that the linear hall sensors generate position signals that are linearly proportional to motion of the read/write head.

9. The tape drive of claim 7, further comprising a suspension system to which the head actuator is coupled, and a servo system responsive to position signals from the one or more position sensors to control movement of the head actuator to dampen suspension system resonance.

10. The tape drive of claim 9, wherein the servo system has: a velocity determination module that differentiates the position signals generated by the one or more position sensors to derive read/write head velocity information; and a servo control signal module that generates servo control signals to dampen suspension system resonance based on the read/write head velocity information.

11. A tape drive, comprising:
a head actuator for a read/write head;
a suspension system on which the head actuator is mounted; and a damping system coupled to the head actuator to dampen suspension system resonance, the damping system including one or more position sensors mounted on the head actuator;

flexible printed circuits coupled to the read/write head, and wherein the one or more position sensors are coupled to the servo system via the flexible printed circuits; and a printed circuit board, wherein the head actuator has a fine positioner and a coarse positioner, and further comprising fine and coarse positioner loops coupled between the fine positioner and the coarse positioner respectively and the printed circuit board, the fine and coarse positioner loops being combined into a single loop carried by the flexible printed circuit wherein the single loop comprises adjacent portions of flexible printed circuits, attached to opposite sides of the read/write head, simultaneously moving when the read/write head is being moved by the fine or coarse positioner.

* * * * *